(12) United States Patent
Griffiths et al.

(10) Patent No.: US 10,849,331 B2
(45) Date of Patent: Dec. 1, 2020

(54) SMOKED FOOD, METHOD FOR SMOKING FOOD AND APPARATUS THEREFOR

(71) Applicant: PureSmoke Limited, Arundel (GB)

(72) Inventors: Huw David Griffiths, Arundel (GB); David Allan Baines, South Gloucestershire (GB); Jane Ker Parker-Gray, Surrey (GB)

(73) Assignee: PURESMOKE LIMITED, Arundel (GB)

( * ) Notice: Subject to any disclaimer, the term of this patent is extended or adjusted under 35 U.S.C. 154(b) by 684 days.

(21) Appl. No.: 14/904,924

(22) PCT Filed: Jul. 15, 2014

(86) PCT No.: PCT/EP2014/065170
§ 371 (c)(1),
(2) Date: Jan. 13, 2016

(87) PCT Pub. No.: WO2015/007742
PCT Pub. Date: Jan. 22, 2015

(65) Prior Publication Data
US 2016/0143328 A1 May 26, 2016

(30) Foreign Application Priority Data
Jul. 15, 2013 (GB) .................................. 1312634.7

(51) Int. Cl.
*A23B 4/048* (2006.01)
*A23B 4/052* (2006.01)
(Continued)

(52) U.S. Cl.
CPC .............. *A23B 4/048* (2013.01); *A23B 4/052* (2013.01); *A23B 4/0523* (2013.01); *A23L 5/21* (2016.08);
(Continued)

(58) Field of Classification Search
CPC . A23L 27/27; A23L 2/56; A23B 4/044; A23B 4/048; A23B 4/052; A23B 4/0523; A23B 4/0526; Y02A 40/949
See application file for complete search history.

(56) References Cited

U.S. PATENT DOCUMENTS 4,201,232 A   5/1980 Kaye
4,370,988 A   2/1983 Terasaki
(Continued)

FOREIGN PATENT DOCUMENTS

AU   2008/100863   11/2008
CA   700813   12/1964
(Continued)

OTHER PUBLICATIONS

Opinion of the Scientific Committee on Cosmetic Products and Non-Food Products Intended for Consumers Concerning Wood Tars and Wood Tar Preparations (Year: 2003).*
(Continued)

*Primary Examiner* — Erik Kashnikow
*Assistant Examiner* — Lela S. Williams
(74) *Attorney, Agent, or Firm* — Casimir Jones, S.C.; Tanya Arenson

(57) ABSTRACT

Food for human consumption is smoked by providing smoke, removing one or more polycyclic aromatic hydrocarbons (PAHs) from the smoke and contacting the food with the treated smoke, or smoking the food and then removing the PAHs from the smoked food. PAH removal is selective, to remove the PAHs that contain 4 or more benzene rings, in particular without significantly changing the volatile profile of the smoked food. A selective filter is provided, as is apparatus comprising a smoke generator, a chamber in which to smoke food, and the selective filter, disposed between the smoke generator and the chamber.

10 Claims, 9 Drawing Sheets

(51) Int. Cl.
  *B01D 53/04* (2006.01)
  *A23L 27/27* (2016.01)
  *A23L 5/20* (2016.01)

(52) U.S. Cl.
  CPC .............. *A23L 5/23* (2016.08); *A23L 27/27* (2016.08); *B01D 53/04* (2013.01); *B01D 53/0407* (2013.01); *A23V 2002/00* (2013.01); *B01D 2253/108* (2013.01); *B01D 2253/308* (2013.01); *B01D 2257/7027* (2013.01); *B01D 2258/0275* (2013.01); *B01D 2258/06* (2013.01); *Y02A 40/949* (2018.01)

(56) References Cited

U.S. PATENT DOCUMENTS

| | | | |
|---|---|---|---|
| 5,013,567 A | * | 5/1991 | Govenius ............. A23B 4/0523 426/314 |
| 5,484,619 A | | 1/1996 | Yamaoka et al. |
| 5,540,241 A | | 7/1996 | Kim |
| 5,972,401 A | * | 10/1999 | Kowalski ............... A23B 4/044 426/314 |
| 2002/0148478 A1 | | 10/2002 | Pera |
| 2010/0186759 A1 | | 7/2010 | Thone |
| 2010/0189617 A1 | | 7/2010 | Hundley et al. |

FOREIGN PATENT DOCUMENTS

| | | |
|---|---|---|
| CN | 1059267 | 3/1992 |
| CN | 1456062 A | 11/2003 |
| CN | 101121906 | 2/2008 |
| CN | 101019568 B | 11/2010 |
| CN | 201709357 | 1/2011 |
| DE | 20203333 | 5/2002 |
| EP | 0740907 A1 | 11/1996 |
| EP | 1020419 A1 | 7/2000 |
| EP | 1238594 | 9/2006 |
| EP | 2384675 | 11/2011 |
| HR | 20050615 | 4/2007 |
| HU | 185919 | 4/1985 |
| KR | 890003397 | 9/1989 |
| KR | 9513241 | 10/1995 |
| RU | 2057165 | 3/1996 |
| RU | 2330876 | 8/2008 |
| TR | 200503965 | 10/2005 |
| WO | 85/02848 | 7/1985 |
| WO | 91/04948 | 4/1991 |
| WO | 98/33023 | 7/1998 |
| WO | 99/27794 A1 | 6/1999 |
| WO | 02/055115 | 7/2002 |
| WO | 2004/010802 | 2/2004 |
| WO | 2006/099611 | 9/2006 |
| WO | 2007/073495 | 6/2007 |
| WO | 2008/054228 | 5/2008 |
| WO | 2008/100243 | 8/2008 |
| WO | 2009/044375 | 4/2009 |
| WO | 2009/058934 | 5/2009 |
| WO | 2011/094403 | 8/2011 |
| WO | 2013/163127 | 10/2013 |
| WO | 2014/145473 | 9/2014 |

OTHER PUBLICATIONS

Falco, Polycyclic Aromatic Hydrocarbons in Foods: Human Exposure through the Diet in Catalonia, Spain (Year: 2003).*
Perego et al. Biomass to fuels: The role of zeolite and mesoporous materials (Year: 2011).*
Baltrenas et al. Investigation of cleaning efficiency of a biofilter with an aeration chamber (Year: 2009).*
Karayigit et al., Mineralogy and geochemisty of feed coal and their combustion residues from the Cayirhan power plant, Ankara, Turkey. (Year: 2001).*
Chandrasekhar et al., "A process for reduction of benzo(a)pyrene content in smoked oil sardine" FAO Fish. Report, 1985, vol. 317, Suppl., pp. 262-266.
International Search Report and Written Opinion, International Patent Application No. PCT/EP2014/065170, dated Nov. 6, 2014.
European Food Safety Authority: "Safety of smoke flavour Primary Product—Smoke Concentrate 809045; Scientific Opinion of the Panel on Food Contact Material, Enzymes, Flavourings and Processing Aids (CEF)" The EFSA Journal, European Food Safety Authority, vol. 7, No. 4, Jun. 11, 2009, pp. 1-21.
"Traditional smoking and preservation of meat: Prosciutto25/traditional-smoking-and-pre", Jan. 1, 2012, Retrieved from the Internet: URL:http://blog.prosciutto.it/en/2012/05/25/traditional-smoking-and-preservation-of-meat/.
Search Report, GB Application No. 1312634.7, dated Jan. 17, 2014, five pages.
Matos et al. "Development of a New Adsorbent Filter to Reduce/Eliminate Polycyclic Aromatic Hydrocarbons (PAHS) from Smoked Meat Products" FoodInnova, 2010, retrieved from the Internet: http://www.foodinnova.com/foodInnova/docu2/328.pdf.
Afzali et al. "Studies on the Potential of Natural Zeolites and Modified Natural Zeolites Towards the Removal of Heavy Metals from Smoke Cigarette" Asian Journal of Chemistry (2007), 19(3) pp. 1723-1727.
Radojicic et al. "Effect of varied quantities of zeolite on the reduction of polycyclic aromatic hydrocarbons in tobacco smoke" African Journal of Biotechnology (2012), 11(42), 10041-10048.
Hossein et al. "Removal of PAHs from n-Paraffin by Modified Clinoptilolite" Iran. J. Chem. Eng. (2007), 26(3), 121-127.
Macala et al. "Reduction of polycyclic aromatic hydrocarbons and nitrogen monoxide in combustion engine exhaust gases by clinoptilolite" Gospodarka Surowcami Mineralnymi (2012), 28(2), pp. 113-122.
Eleroglu, H. and Yalcin, H. "Use of natural zeolite-supplemented litter increased broiler production" South African Journla of Animal Science, 2005, 35 (2), pp. 90-97.

* cited by examiner

SMOKED FOOD, METHOD FOR SMOKING FOOD AND APPARATUS THEREFOR

FIELD OF THE INVENTION

This invention relates to methods for smoking food, in particular to methods for producing smoke for smoking food or for treating smoked food, apparatus therefor, and food produced by these methods.

BACKGROUND TO THE INVENTION

Smoking has historically been used to preserve food, to add colour and to add firmness to some foods (by cross-linking e.g. of proteins). Smoking alters the flavour of food, and there is a high consumer demand for smoked food, such as meat, salt, sugar and spices, and for food flavoured with smoky additives such as smoke condensate.

However, chemical contaminants are formed during the combustion of fuel in the smoking process, and when included in smoked food can enter the food chain. Example contaminants include polycyclic aromatic hydrocarbons (PAHs), dioxins, formaldehyde, nitrogen and sulphur oxides.

PAHs are a large class of organic compounds comprising two or more fused aromatic rings. They are primarily formed by incomplete combustion or pyrolysis of organic matter and during various industrial processes such as food smoking. PAHs generally occur in complex mixtures. The European Commission's Scientific Committee on Food has concluded that fifteen PAHs, namely benz[a]anthracene, benzo[b]fluoranthene, benzo[j]fluoranthene, benzo[k]fluoranthene, benzo[ghi]perylene, benzo[a]pyrene, chrysene, cyclopenta[cd]pyrene, dibenz[a, h]anthracene, dibenzo[a,e]pyrene, dibenzo[a,h]pyrene, dibenzo[a,i]pyrene, dibenzo[a,l]pyrene, indeno[1,2,3-cd]pyrene and 5-methylchrysene demonstrate clear evidence of mutagenicity/genotoxicity in somatic cells in experimental animals in vivo and with the exception of benzo[ghi]perylene also show clear carcinogenic effects in various types of bioassays in experimental animals.

It is believed, however, within the food industry that useful and desirable components of smoke are intimately mixed in with the PAHs and that their removal would adversely affect the smoke flavour or the flavour of smoked foods.

WO 99/27794 describes treating smoke prior to contact with food. The smoke is treated to remove substantially all taste imparting components.

Electrostatic filters are known to be used in certain smoking operations; these are for removal of particulates e.g. soot and do not treat the smoke.

CN 101019568 describes apparatus for curing food products using smoke and a smoke filter. Removal of PAHs is not disclosed.

An object of the invention is to provide an alternative method of smoking food. In particular embodiments, the invention aims to provide an improved process for smoking food and improved apparatus therefor, and improved smoke for smoking food or for preparation of food additives and ingredients.

SUMMARY OF THE INVENTION

Surprisingly, it has been found that PAH compounds can selectively be removed from both smoke and smoked food whilst retaining a highly desirable flavour in the smoke, in food smoked therewith and/or in the smoked food.

Accordingly, the invention provides a method of preparing a food, comprising:—

1 (a) treating smoke to selectively remove one or more PAHs therefrom, and
   (b) contacting the treated smoke of (a) with a food,
or
2 (a) providing a smoked food, and
   (b) treating the smoked food to selectively remove one or more PAHs therefrom, to yield a smoked food for human consumption with reduced PAH content.

The invention also provides filters for filtering PAHs from smoke or from smoked food, food products obtained by smoking food with filtered smoked or by treating smoked food with a filter and related apparatus, methods and compositions.

DETAILED DESCRIPTION OF THE INVENTION

In methods herein, the treating of step 1(a) may comprise contacting the smoke with a filter in gas phase, optionally passing the smoke through the filter, to remove gaseous PAHs. The treating of step 2(b) may comprise contacting the smoked food with a filter in solution, optionally passing the food through the filter. Both approaches have been found to yield smoked food with PAHs preferentially removed.

The methods may comprise removing the one or more PAHs from the smoke or food using a filter. For example, the level of PAH is reduced by passing the smoke through a filter or directly contacting food with the filter.

The filter may be a natural or synthetic porous mineral. In particular, the mineral may be a zeolite. In a particularly preferred embodiment, the zeolite is clinoptilolite. Typically, filter material in the form or powder or granules is packed into and retained in or on a filter holder such as a box or column. In preparation of filters for use in the invention, the filter material may also be combined with other components, e.g. with support material, with sand or iron salts.

The method of filtration to remove PAHs may comprise size exclusion, ion exchange or absorption. The method of filtration is preferably size exclusion, absorption or a combination of both size exclusion and absorption. In specific examples of the invention, described in more detail below, a filter in the form of a zeolite has been used selectively to remove significant quantities of and in some cases substantially all of particular PAHs via size exclusions and/or absorption.

To be useful as a size exclusion and/or absorption filter, the filter for use in the invention should preferably have a pore size designed selectively to prevent passage of or to absorb PAHs while allowing passage of or otherwise not retaining desirable smoke flavour constituents. Suitable filters remove from the smoke PAHs containing 4, 5 or more benzene rings, thus removing PAHs such as pyrene, benz(a)anthracene, naphthacene, chrysene, benzo(a)pyrene and dibenz(a,h)anthracene. A pore size of approximately 10 Angstroms (1 nm) or smaller, or approximately 7 Angstroms (0.7 nm) or smaller or approximately 6 Angstroms (0.6 nm) or smaller can provide this filtering. Other suitable filters also remove PAHs containing 3 or more rings, thus removing PAHs such as anthracene, phenanthrene and 2-methyl anthracene. The 3-ring PAHs tend to be physically smaller and so a slightly smaller pore size can achieve this filtering, e.g. a pore size of approximately 6 Angstroms (0.6 nm) or smaller or approximately 5 Angstroms (0.5 nm) or smaller.

Still further suitable filters may be used to also remove PAHs having just 2 rings. As will be appreciated, PAH size is related to but not directly proportional to the number of rings and a filter that removes PAHs having 2 rings will also remove larger PAHs e.g. having 3, 4, 5 or more rings. A suitable pore size for the 2 ring PAHs in general is approximately 4 Angstroms (0.4 nm) or smaller, found to remove PAHs with 2 rings, such as naphthalene and/or phenanthrene and other smaller PAHs such as fluorene. Desirable flavour components may also have sizes in this approximate size range, being in general smaller in size but approaching the size of the smaller PAHs. Hence it is preferred not to use a pore size that is so small that it removes those flavour components. To retain desirable flavours the filter preferably includes pores of size not smaller than approximately 1 Angstrom (0.1 nm), not smaller than approximately 2 Angstroms (0.2 nm) or not smaller than approximately 3 Angstroms (0.3 nm).

Typically, filters contain pores that vary in size within certain limits. Preferred filters of the invention contain pores that fall within all combinations of the pore size limits described herein. In a specific embodiment of the invention, set out in more detail in examples below, the filter contained pores of from 3.9 to 5.4 Angstroms (0.39 nm-0.54 nm, data provided by filter material supplier). In general, the filter may comprise pores of varying sizes within the ranges: 1 nm or less, 0.7 nm or less, 0.6 nm or less, 0.5 nm or less, 0.4 nm or less and 0.1 nm or more, 0.2 nm or more or 0.3 nm or more. Thus, the filter of the invention may have a pore size of from 0.1 nm to 1 nm, preferably 0.2 to 0.7 nm, more preferably 0.3 to 0.6 nm. In other embodiments of the invention, the filter has substantially few or no pores greater than 1 nm in size, preferably substantially no pores greater than 0.7 nm, more preferably substantially no pores greater than 0.6 nm.

Pre-treatment of the filter may be employed to modify and preferably improve its properties and/or activity. In an embodiment of the invention, the filter is pre-treated by soaking in mild acid, preferably containing ammonium ions, suitably ammonium chloride. For example, the filter may be soaked in approximately 1 molar ammonium chloride, for instance for approximately 24 hours prior to use. Generally, the filter is dried prior to use.

A separate, also optional, though related step is to treat the filter by ion exchange so as to exchange sodium ions in the zeolite, preferably clinoptilolite, with lithium, potassium or preferably ammonium ions. The filter can be treated with KOH, KCl, LiOH, LiCl or ammonium ions for this purpose, e.g. using ammonium chloride as described above and in more detail in specific embodiments below. Again, the filter material is generally dried prior to use. X-ray diffraction analysis, described in examples below, showed structural change as a result of this treatment.

A further separate, also optional, step is to heat the filter prior to or during use. Heat treatment assists filter performance by opening channels in the filter material e.g. by removing water, and can be for an hour or more, a few hours or up to about 12 hours. An embodiment of the invention comprises pre-treating the filter by heating or baking at 150° C. or higher, preferably 200° C. or higher, typically at around 270° C. or more. Baking/heating activates the filter in that it is better able to remove PAHs from smoke. The filter may also be baked/heated between batches of smoke treatment to re-activate the filter.

In a particularly preferred embodiment, the filter is both ion exchanged as described and heated as described.

A filter of a specific embodiment of the invention is obtainable by heating a zeolite, e.g. clinoptilolite, at a temperature above 50 degrees C., or above 70 degrees C., or above 100 degrees C., or above 150 degrees C. for a period of 30 minutes or more, 40 minutes or more, 50 minutes or more or 60 minutes or more. X-ray diffraction analysis, described in examples below, showed structural change as a result of this heating. A further specific filter of the invention is obtainable by treating the zeolite, e.g. clinoptilolite, with ammonium ions then heating the clinoptilolite at a temperature above 50 degrees C., or above 70 degrees C., or above 100 degrees C., or above 150 degrees C. for a period of 30 minutes or more, 40 minutes or more, 50 minutes or more or 60 minutes or more. These same steps, heating or treating by ion exchange then heating, can also be used to process and revive used or partially used filter material. In examples described below in more detail, ammonium chloride treated clinoptilolite did not revert back (or at least not fully) to a native form. That treated filter was readily activated (or re-activated) by further hearting, e.g. at the temperatures and for the times set out above. The treated filter was also found to retain useable activity after contact with water, hence indicating it can be used in aqueous environments.

Suitably, the treating comprises filtering the smoke or food selectively to remove one or more PAHs that contain 3 or more benzene rings. Preferably, the treating comprises filtering the smoke or food selectively to remove one or more PAHs that contain 4 or more benzene rings. Typically, the method removes a plurality of the PAH compounds and in specific embodiments of the invention described in more detail below in examples removal of substantially all of a large number of PAHs has been achieved. In embodiments of the invention, the one or more PAHs are selected from benzo(a)pyrene, benz(a)anthracene, benzo(b)fluoranthene, benzo(j)fluoranthene, benzo(k)fluoranthene, benzo(g,h,i)perylene, chrysene, cyclopenta(c,d)pyrene, dibenz(a,h)anthracene, dibenzo(a,e)pyrene, dibenzo(a,h)pyrene, dibenzo(a,i)pyrene, dibenzo(a,l)pyrene, indeno(1,2,3-cd)pyrene or 5-methylchrysene. The method removes significant quantities of one or more of the PAHs, and preferably removes significant quantities of a plurality of the PAHs. In specific examples, described below, particular PAHs known to be carcinogenic are substantially removed but the smokey flavour is substantially unimpaired. Methods of the invention may thus comprise selectively removing the PAHs benzo(a)pyrene, benz(a)anthracene, dibenz(a,h)anthracene, two of those PAHs or all three. In particularly preferred embodiments, the method reduces the level of at least benzo(a)pyrene and/or benz(a)anthracene.

An advantage of embodiments of the invention is the retention of desirable flavours, while removing some or most or substantially all of certain larger, undesired PAHs. The treating optionally comprises filtering the smoke or food selectively to remove the PAHs that contain 4 or more benzene rings compared with removal of naphthalene and/or phenanthrene from the smoke or food. Generally, the treating comprises filtering the smoke or food selectively to remove the PAHs that contain 4 or more benzene rings compared with removal of smoke-flavoured components from the smoke or food. In preferred embodiments of the invention, exemplified in examples below, the treating comprises filtering the smoke or food selectively to remove the PAHs that contain 4 or more benzene rings without significantly changing the volatile profile of the smoked food compared with smoked food prepared without filtering the smoke or smoked food. In a specific example, the volatile profile of products was compared between untreated smoked food, food smoked with smoke treated by filtration using one filter of the invention and food smoked with smoke treated by filtration with a second filter of the invention. The volatile profiles were substantially the same across all three, and these results agreed with the subjective testing of the flavour—both indicating the smokey flavour was unimpaired. Certain testers also reported absence of an unpleasant element of the normal smokey flavour, in which certain harsh, oily components of the flavour appeared to be lessened or removed. Hence from that perspective the flavour was further improved.

In particular embodiments, the invention provides a method for producing smoke for smoking food comprising reducing the level of a polycyclic aromatic hydrocarbon (PAH) in the smoke, and provides uses for the resultant smoke.

The invention also provides a method for smoking food comprising producing smoke with a reduced level of a PAH.

In particular, the invention provides a method of smoking food for human consumption, comprising:
providing smoke;
removing one or more PAHs from the smoke; and
contacting the food with the smoke.

As the smoke produced or used in the methods contains reduced levels of PAH, less PAH is deposited in or on the food, while still imparting a smoky flavour. Indeed, the method produces a smoky flavour that is considered by some to be more pleasant due to the removal of subjectively unpleasant aspects of the flavour and/or taste imparted by the smoking process.

In a second aspect of the invention, there is provided a method of smoking food that comprises reducing the level of one or more PAHs by catalysis by passing the smoke through or over a catalyst.

The filter and the catalyst may be the same material, and in a preferred embodiment the catalysis occurs in the filter.

The methods of the invention provide generally for removal of carcinogenic and other undesirable PAH compounds from the smoke. The resultant, cleaned or filtered smoke is thus more acceptable in preparing food for human consumption.

Suitably, the levels of the one or more PAHs is reduced so as to significantly reduce the toxic, e.g. carcinogenic, properties of the smoke or food. The method of the invention hence may reduce the level of the one or more PAHs by more than 50% compared with untreated smoke/food, preferably by more than 80%, more preferably more than 90%, most preferably more than 95%, more than 98% or more than 99%. It is further preferred that the levels of a plurality of the one or more PAHs is reduced by these stated amounts, and still further preferred that the levels of at least both benz(a)anthracene and benz(a)pyrene are reduced to these extents.

In particularly preferred embodiments, the level of the one or more PAHs is reduced substantially to zero. In this context, the level of the one or more PAHs is reduced to at least below levels detectable using standard analytical tools. In some instances, for example, in the specific embodiments described below, several of the PAHs were removed from smoke to an extent where they could no longer be detected in treated smoke.

In specific embodiments of the invention, described in more detail in examples below, treatment of smoke reduced the levels of both benz(a)anthracene and benzo(a)pyrene by more than 80% compared with untreated smoke and reduced the level of benzo(a)pyrene by more than 95%.

In general, the fuel for the source of the smoke is not limited, provided that the smoke is regarded as useable for smoking food for human consumption. The method of the invention typically comprises generating smoke from a combustible source, e.g. generates wood smoke. Other sources of smoke apart from wood include charcoal, herbs, tea and botanicals (optionally to provide additional flavouring in combination with one or more other sources).

Smoke is typically generated from a combustion material or fuel provided in a form that is relatively dry and can be combusted to yield smoke to generate smoke flavour. Common materials used in the industry for generating smoke are: wood chips, wood dust, wood shavings, wood briquettes, logs, charcoal and charcoal briquettes. In operation of the invention, we have successfully used oak, hickory, cherry, apple and beech wood. Other suitable woods and other smoke sources include alder, barley, malted barley, black walnut, walnut, cedar, chestnut, corn cobb, maple, mesquite, mulberry, orange, pear, pecan and plum, and also mixtures thereof.

Smoking methods may use one or more smoking chambers in which to smoke the food. A particular embodiment provides a method comprising generating smoke, passing the smoke through a filter, to remove the one or more PAHs from the smoke, and into a chamber, and contacting filtered smoke with food in the chamber. The filter is thus located between the smoke generator, e.g. wood fire, and the chamber in which smoking takes place.

Also provided by the invention is food smoked according to the method of the invention. This food may comprise any type of food, including food ingredients and food additives such as food flavourings.

The food may be in any form, for example wet or dry, solid or free flowing. For example, the food may be cheese, other dairy produce, meat (including fish and poultry), fruit or vegetables, the food ingredients may be water, salt, herbs, fats, sweeteners, stabilisers, fibres, sugar, oil, spices, flour, starches, botanicals and extracts, and the food additive may be a smoke condensate.

Prior to contact with food, treated smoke is optionally cooled and/or dried. Condensing moisture out of the treated smoke is preferred for foods that would be adversely affected by an increase in water content.

Typical contact time to smoke foods using the invention is as for existing smoking processes. In specific examples carried out to date, smoking for approximately 3 minutes has produced smoked juice, sauce and water for immediate tasting purposes and smoking water for approximately 60 minutes has produced smoked water suitable as a food flavouring. In general, industry-used smoking times are not altered significantly through use of the treated smoke of the invention, and many smoking process take much longer e.g. hours and days, though if treated smoke reduces the intensity of smoke flavour then a longer duration of smoking may in some cases be employed.

Specific embodiments of the invention include smoke flavoured food, with reduced PAH content, obtainable according to the invention, smoked flavour oil, smoke flavouring, smoke flavoured salt and smoke flavoured sugar all obtainable according to the methods of the invention Another method of the invention provides a method of preparing a food additive, e.g. a food flavouring, in liquid form for human consumption, comprising:—
providing smoke;

reducing the levels of one or more PAHs from the smoke; and extracting a liquid soluble component from the smoke to form an extract usable as the food additive.

A related method of the invention provides a method of preparing a food additive, e.g. a smoke flavouring, in liquid form for human consumption, comprising:— providing smoke;

reducing the levels of one or more PAHs in the smoke; and condensing the smoke having reduced PAH content to form a food flavouring.

The method for preparing a food additive may comprise removing the one or more PAHs from the smoke using a filter, preferably as per any and all of the optional and preferred PAH removal methods described elsewhere herein.

In an embodiment of the invention, the method for preparing a food additive comprises dissolving the liquid soluble component in (i) a liquid such as water or an aqueous liquid, preferably water, or (ii) a non-aqueous solvent, an oil or a fat.

Within the invention, foods include a foodstuff or food product (being a food ready for consumption with no or minimal further processing), a food additive, a food flavouring and/or a food ingredient. The food may thus be a solvent or solution acceptable in the food industry. It may be salt, sugar, oil or meat. The oil may in general be or comprise any edible oil, such as coconut oil, corn oil, cottonseed oil, olive oil, palm oil, peanut oil (ground nut oil), rapeseed oil, safflower oil, sesame oil, soybean oil, sunflower oil, mustard oil, a nut oil, a citrus oil, other edible oils, any other oil suitable for human consumption, or mixtures thereof. Oils may also be regarded as solvents in the context of the invention.

In carrying out the invention, suitable solvents, being solvents that can be treated with filtered smoke or that can be smoked and then treated with a filter, include oils as mentioned above and solvents permitted for use with flavourings such as water, ethyl alcohol, benzyl alcohol, glyceryl triacetate, glyceryl diacetate, triethyl citrate and propane-1,2-diol. Suitable solvents also embrace solvents that may be used only in reduced amounts in the ultimate food product but can be used in initial processing steps, e.g. to trap the smoke flavour, and then removed or reduced during preparation of the food product. Those solvents include gmp extraction solvents such as ethyl acetate and acetone. Known other gmp solvents include propane, butane, carbon dioxide, nitrous oxide and 1,1,1,2-tetrafluoroethane, though as these are gases at room temperature and pressure their use may require special equipment or be impractical in more common set ups. Still further solvents that can be used but again generally require to be removed or reduced in a final food product include hexane, methyl acetate, ethylmethylketone, dichloromethane, methanol, propan-2-ol, diethyl ether, cyclohexane, methyl acetate, butan-1-ol, butan-2-ol and propan-1-ol. Mixtures of solvents may also be used. Embodiments of the invention hence comprise use of a solvent for initial concentration of smoke flavour with reduced PAH content then further processing to prepare or otherwise derive a food product in which some or most of that solvent is removed.

An advantage of the invention is that production of smoke flavourings with levels of certain PAHs within limits set by food licensing authorities is facilitated. Using the invention makes it easier to provide smoked food with e.g. 10 ppb or less benzo(a)pyrene and 20 ppb or less benz[a]anthracene.

Reference to food flavouring herein include reference to smoke flavouring, especially liquid smoke flavouring.

"Smoke flavouring" herein includes a product obtained by fractionation and purification of a condensed smoke yielding primary smoke condensates, primary tar fractions and/or derived smoke flavourings. A preferred definition appears in points (1), (2) and (4) of Article 3 of Regulation (EC) No 2065/2003. A "primary smoke condensate" may refer to the purified water-based part of condensed smoke and falls within the definition of "smoke flavourings". A "primary tar fraction" may refer to the purified fraction of the water-insoluble high density tar phase of condensed smoke and also falls within the definition of 'smoke flavourings'. A "primary product" may refer to primary smoke condensates and primary tar fractions. A "derived smoke flavouring" may refer to flavourings produced as a result of further processing of primary products and which are used or intended to be used in or on foods in order to impart smoke flavour to those foods.

In typical smoking processes, wood chips are smouldered in specially designed rotary furnaces that allow for the control of oxygen, moisture and temperature. The smoke produced is then passed into cold water in a condensing tower to produce a crude liquid smoke and the condensate is held for a period, say a minimum of 10 days, to allow insoluble materials to settle out. The primary tar fraction is purified to produce oil soluble smoke flavours. Embodiments of the invention comprise such fractions, treated as per the invention. The liquid fraction is passed through a multistage filtration process to produce water soluble smoke flavours. These flavours may be referred to as primary smoke condensates, and further embodiments of the invention comprise such condensates, treated as described.

More specifically, in known processes the tar fraction is the non-aqueous fraction that settles to the bottom of the storage tank when the smoke condensate is allowed to settle over a period of, say, 10 days. The process to obtain that fraction involves passing smoke upwards through a condensing tower against a counter current of water. This is passed to a holding tank and the water from this containing the first pass of condensed smoke is pumped back through the condensing tower to receive a second pass of smoke. This can continue until the pH of the aqueous smoke solution in the holding tank drops to the right level, generally around pH 4.2. This is then passed to a storage tank where it is held until the aqueous and tar fractions separate. The tar sinks to the bottom showing it is heavier than water. In specific examples of the invention described in more detail below, we have found that this tar is removed by the filters of the invention. Untreated smoked sunflower oil was found to be brown in colour whereas the filter treated smoked oil was yellow in colour, representing full or partial elimination of the tar. The tar is believed to comprise high molecular weight polymers derived from the pyrolysis of lignin, cellulose and hemicellulose from wood and these may by trapped by the filter. Hence, a further advantage of the invention lies in removal of tar in additional to the selective removal of carcinogenic smoke components.

Further embodiments of the inventions comprise liquid smoke flavours, either water or oil based. Spray dried powders can be produced or derived therefrom. All can be applied to the surface of products by dry rub or aerosol spray, added into the brine of cured products or blended into dry seasonings, marinades and sauces.

A particularly preferred method of preparing a food additive comprises condensing the smoke in or with water vapour or steam to yield an aqueous preparation comprising smoke extract.

In a further embodiment of the invention, the method for preparing a food flavouring comprises dissolving the liquid soluble component in an oil, fat or lipid, such as an edible oil, edible fat or similar e.g. butter.

Accordingly, the invention also provides a smoke flavouring made according to the method of preparing a food additive.

Flavourings of the invention can also be spray dried, either per se or in combination with or onto another food constituent. Liquid food flavourings can for example be spray dried for use as dry flavourings for snacks e.g. crisps, or spray dried onto starch to form powders.

Still further, the invention provides an apparatus for smoking food for human consumption, comprising:
 a smoke generator;
 a chamber in which to smoke food; and
 a filter to remove one or more PAHs from the smoke and disposed between the smoke generator and the chamber.

The apparatus may suitably comprise a fire box, a filter and a smoking chamber in sequential gas connection, wherein the filter comprises zeolite. The apparatus may comprise a pump to generate a pressure differential so as to push or draw smoke through the filter into the chamber. The filter of the apparatus is preferably as defined with respect to the optional and preferred methods of the invention elsewhere herein. For example, the filter of the apparatus is preferably a size exclusion/absorption filter. Preferably, the filter comprises clinoptilolite.

Yet further, the invention provides a filter per se for use in removing one or more PAHs from smoke to be used for smoking food for human consumption. The filter can be used (as described elsewhere herein) to remove PAHs from smoke in existing food smoking apparatus. In particular, the filter selectively removes one or more PAHs that contain 4 or more benzene rings from a fluid.

The filter may selectively remove the PAHs that contain 4 or more benzene rings compared with removal of naphthalene and/or phenanthrene. It may selectively remove the PAHs that contain 4 or more benzene rings compared with removal of smoke-flavoured components from the smoke or food. Very preferably, the filter selectively removes the PAHs that contain 4 or more benzene rings without significantly changing the volatile profile of the smoked food compared with smoked food prepared without filtering the smoke or food. The filter preferably selectively removes benzo(a)pyrene, benz(a)anthracene, dibenz(a,h)anthracene, two of these or all three. Other optional and preferred features of the filter per se are as described elsewhere herein in relation to the filter or uses thereof.

Embodiments of the invention comprise filter material, or use thereof, that has been treated to resist damage by water, e.g. to resist reversion to a relatively low PAH absorbing/filtering form by exposure to water. In a specific example, ammonia treated clinoptilolite does not revert to its previous, native form and can be exposed to and used in an aqueous environment. Hence the invention, and these embodiments in particular, can be used to remove PAHs from aqueous solutions or other such solutions with a high water content. Some solvent mixtures may comprise water and some liquids that are smoked according to the invention may have a high water content—such as certain oils that naturally contain a certain amount of water. As specific examples, smoke condensates can be treated as can known aqueous smoke flavourings, e.g. produced by third parties. The invention also provides for removal of PAHs from aqueous residues in general, e.g. from commercial plants.

Removal of PAHs is typically carried out as smoke passes over or through the filter or food is contacted with the filter. The removal can occur, however, at an earlier stage. In still further embodiments of the invention there is provided a composition, comprising a filter according to any element of the invention and combustion material from which smoke for smoking food for human consumption can be generated. In this way, the filter and the smoke source can be provided together, in combination. For example, filter material can be intimately mixed in with the combustion material (which may be as defined elsewhere herein). Those with existing smoking apparatus need make no modification thereto—it is just necessary to use the composition in place of the previous combustion material, wood chips, etc. Selective PAH removal can then occur at source. The composition can be supplied in the form or a pack or kit.

A related method of the invention comprises smoking food by generating smoke for a composition comprising both combustion material and a filter of the invention. The food can then be smoked using the filtered smoke generated, i.e. with selectively reduced PAH levels.

Yet further again, the invention provides a method of modifying apparatus for smoking food for human consumption, comprising adding the filter of the invention to the apparatus—the modified apparatus can be then operated with the filter so as to remove PAHs from smoke prior to contact with food.

Specific embodiments of the invention will now be described in the following Examples with reference to the accompanying drawings in which.

EXAMPLE 1—ANALYSIS OF PAH LEVEL IN SMOKE

Figure 1:
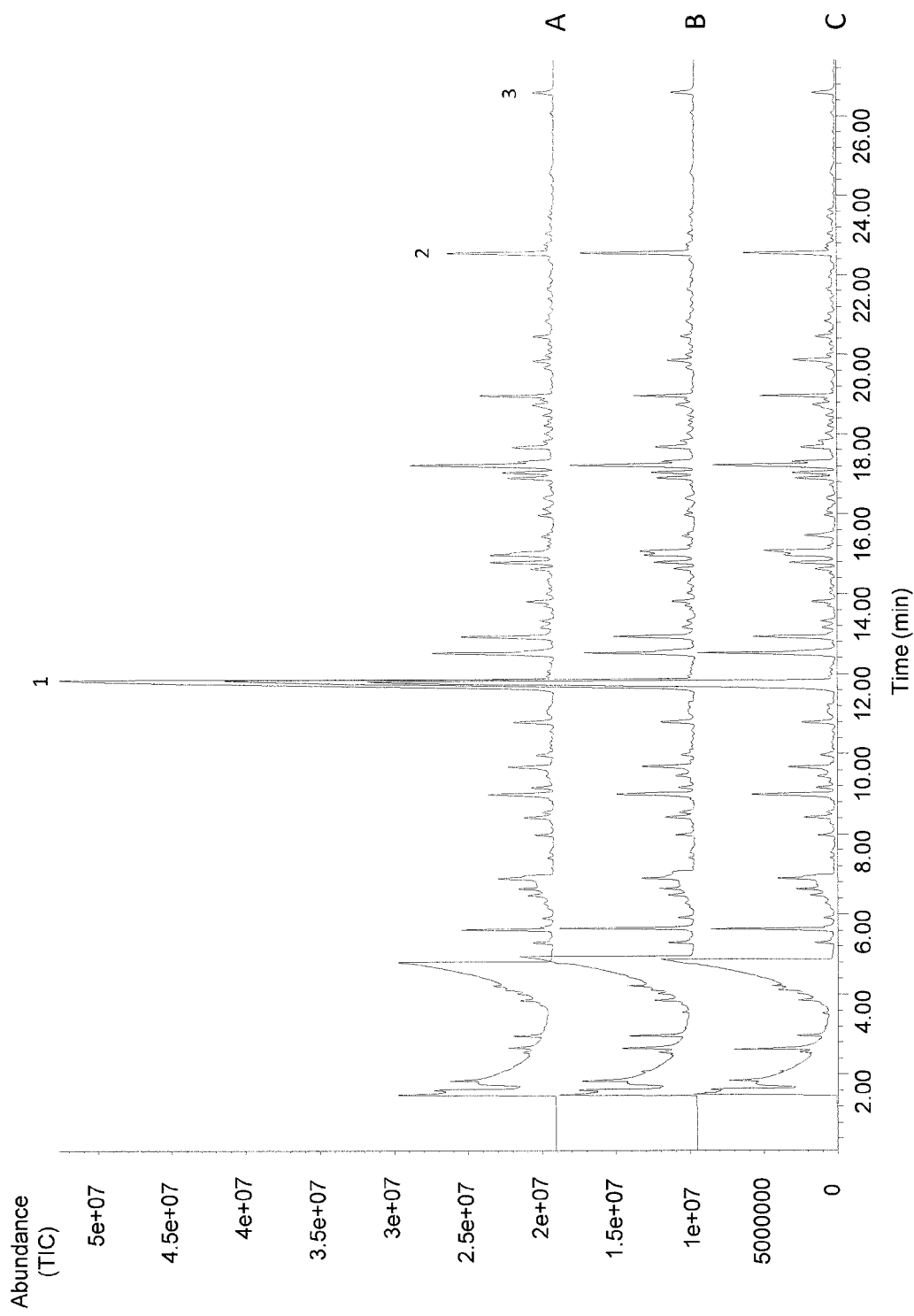
FIG. 1 shows a comparison of volatile profiles of oil smoked with no filter, with a first filter of the invention and with a second filter of the invention, as described in Example 7, the results (1=2-furfural, 2=guaiacol, 3=4-methylguaiacol, A=native clinoptilolite, B=heated clinoptilolite, C=no clinoptilolite) indicating the volatile profiles are not significantly changed.

Smoke was produced, treated and collected in a pressurised apparatus. Untreated smoke was produced by heating over a gas burner a standard conical flask, which comprised an inlet located in a stopper and a hose outlet located on the side of the flask, containing 20 g of chipped oak (report recites 20, 40 and 100 g). Air was pumped into the inlet carrying smoke out from the flask via a hose on the outlet to a condenser formed by second standard conical flask, which comprised an inlet located in a stopper and a hose outlet located on the side of the flask, cooled by an ice bath.

Uncondensed smoke was carried by the air flow under pump pressure from the condenser and split to the inlets of two identical chromatography columns, a first treatment column containing 10 g of granular clinoptilolite (grain size 1-2.5 mm, pore size 0.39-0.54 nm) and a second control column containing 70 g of ceramic 'anti-bumping' granules and 4 g of sand. Loading the columns in this way provided balanced air/smoke flow through each column. Prior to use, the clinoptilolite was activated by baking at 270° C. for about 12 hours.

Air/smoke from the outlet of each column was bubbled in 40 ml of water to produce two samples for analysis. The samples were analysed by gas chromatography-mass spectroscopy (GC-MS) following solid phase extraction (SPE).

SPE was carried out on each sample using Bond Elut CH SPE columns. Prior to loading the samples, the sorbent in the SPE columns was conditioned with 10 ml methanol followed by 10 ml water-methanol (65:35 v/v).

21.5 ml of methanol was added to each sample and the samples were loaded to the columns. The columns were then washed three times with 10 ml of water followed by 10 ml of water-methanol. After drying the SPE column under around 70 kPa of vacuum for 30 minutes, the PAHs were eluted with 4 ml of cyclohexane to obtain a sample for GC-MS analysis. A minimum of 69% of PAH was recovered by SPE.

Table 1 shows the levels of six PAHs by treating smoke using the method of the invention.

TABLE 1

| PAH | Control Level (ng) | Treated Level (ng) |
|---|---|---|
| Benzo(a)pyrene | 0.4 | 0 |
| Benz(a)anthracene | 1.6 | 0.2 |
| Chrysene | 1.6 | 0.2 |
| Benzo(b)fluoranthene | 0.2 | 0 |
| Indeno(1,2,3-cd)pyrene | 0.2 | 0 |
| Dibenz(a,h)anthracene | 0.2 | 0 |

For the compounds which were not present in the treated smoke but were present in the control they were either completely removed by the treatment or were at a concentration below the detection limit.

Table 2 shows the percentage reduction in levels of eleven PAHs by treating smoke using the method of the invention.

TABLE 2

| PAH | Run 1 (% reduction) | Run 2 (% reduction) |
|---|---|---|
| Phenanthrene | 81.1 | 93.4 |
| Anthracene | 87.5 | 95.6 |
| Fluoranthene | 80.1 | 92.1 |
| Pyrene | 82.5 | 92.8 |
| Benz(a)anthracene | 87.9 | 94.0 |
| Chrysene | 86.5 | 92.4 |
| Benzo(b)fluoranthene | 100* | 100* |
| Benzo(k)fluoranthene | 100* | 100* |
| Benzo(a)pyrene | 100* | 100* |
| Indeno(1,2,3-cd)pyrene | 100* | 100* |
| Dibenz(a,h)anthracene | 100* | 100* |

100* = PAH detected in control but not in treated sample

Accordingly, treated smoke had significantly lower levels of PAHs, and in some cases removal of PAH below the current limit of detection.

EXAMPLE 2—LEVEL OF PAH IN SMOKED FOOD SAMPLES

Aliquots of water and of tomato ketchup and tomato juice (commercially available) were bubbled with filtered smoke treated with the clinoptilolite filter as described in Example 1, all for approximately 3 minutes duration.

The aliquots were tested for taste and compared with controls that had been bubbled with unfiltered smoke in parallel for the same duration.

The effect of using filtered smoke was assessed by tasting the aliquots on the tongue and by drinking the water and the juice. The treated smoke yielded samples that had a distinctive smoky flavour, similar in its smoky components though slightly less intense than the flavour achieved using untreated smoke. The untreated smoke yielded samples that imparted a noticeably astringent, alternatively described as acrid or burning, sensation in the mouth, especially around the jowls. This sensation was absent in the samples smoked using treated smoke.

EXAMPLE 3—PREPARATION OF FILTER MATERIALS

A filter of the invention was prepared following this protocol, the resultant material being referred to as treated filter or treated clinoptilolite:

For the Preparation of 600 g of Clinoptilolite Filter Material
  Dissolve 636 g ammonium chloride in 6 litres de-ionised water.
  Add 600 g clinoptilolite.
  Soak for 24 hours.
  Stir the mix at timely intervals.
  Strain the mixture and place recovered clinoptilolite in a tray.
  Dry at 270 degrees C. for 3 hours.

An alternative filter of the invention was prepared following only the heating element of the protocol, i.e. omitting the pre-treatment with ammonium chloride, the resultant material being referred to as heated filter or heated clinoptilolite.

EXAMPLE 4—REMOVAL OF PAHS PRIOR TO SMOKING OF OIL

Materials

Hickory wood chips supplied by Ashwood Smoking Chips Ltd were heated for 3 hours at 130° C. to reduce moisture content. Weight loss after 1 hour was 10.8%, 2 hours 12.0% and 3 hours 12.2%.

Clinoptilolite was supplied by R. S. Minerals Ltd, Guisborough, UK, medium grade (particle size: 1.4 mm, sieve mesh No. 14) and pre-conditioned at 265-285° C. for 3 hours in a Lincat double stone base pizza oven. A further sample of clinoptilolite was soaked in an aqueous solution of ammonium chloride (1M) for 24 hours then heated to 265-285° C. for 3 hours. A control sample of clinoptilolite was used as supplied without heating.

Rapeseed Oil, refined and deodorised, Non GM supplied by BFP Wholesale.

Methodology

Figure 2:
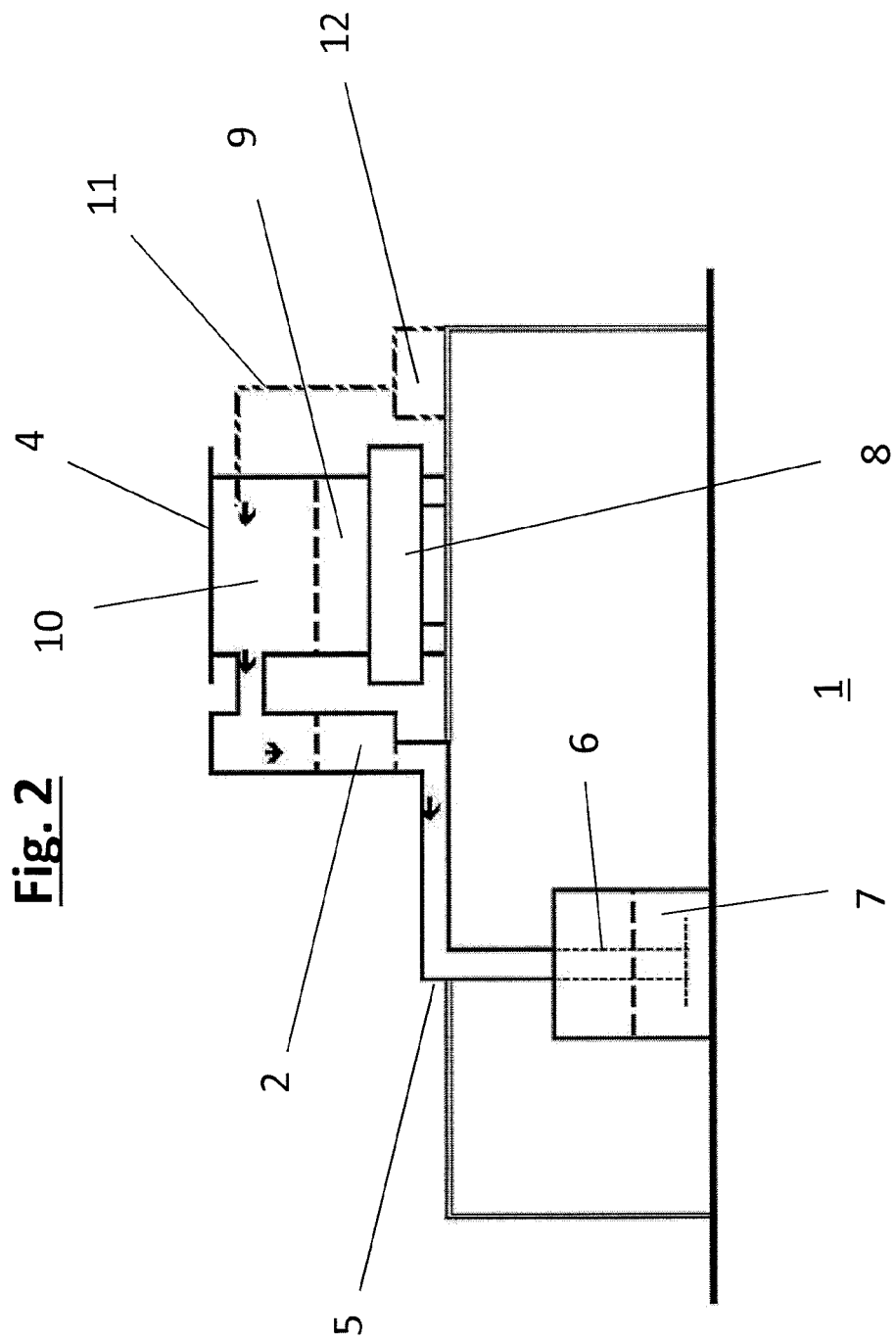
FIG. 2 shows a schematic diagram of the rig used for smoking experiments incorporating filters of the invention.
Figure 3:
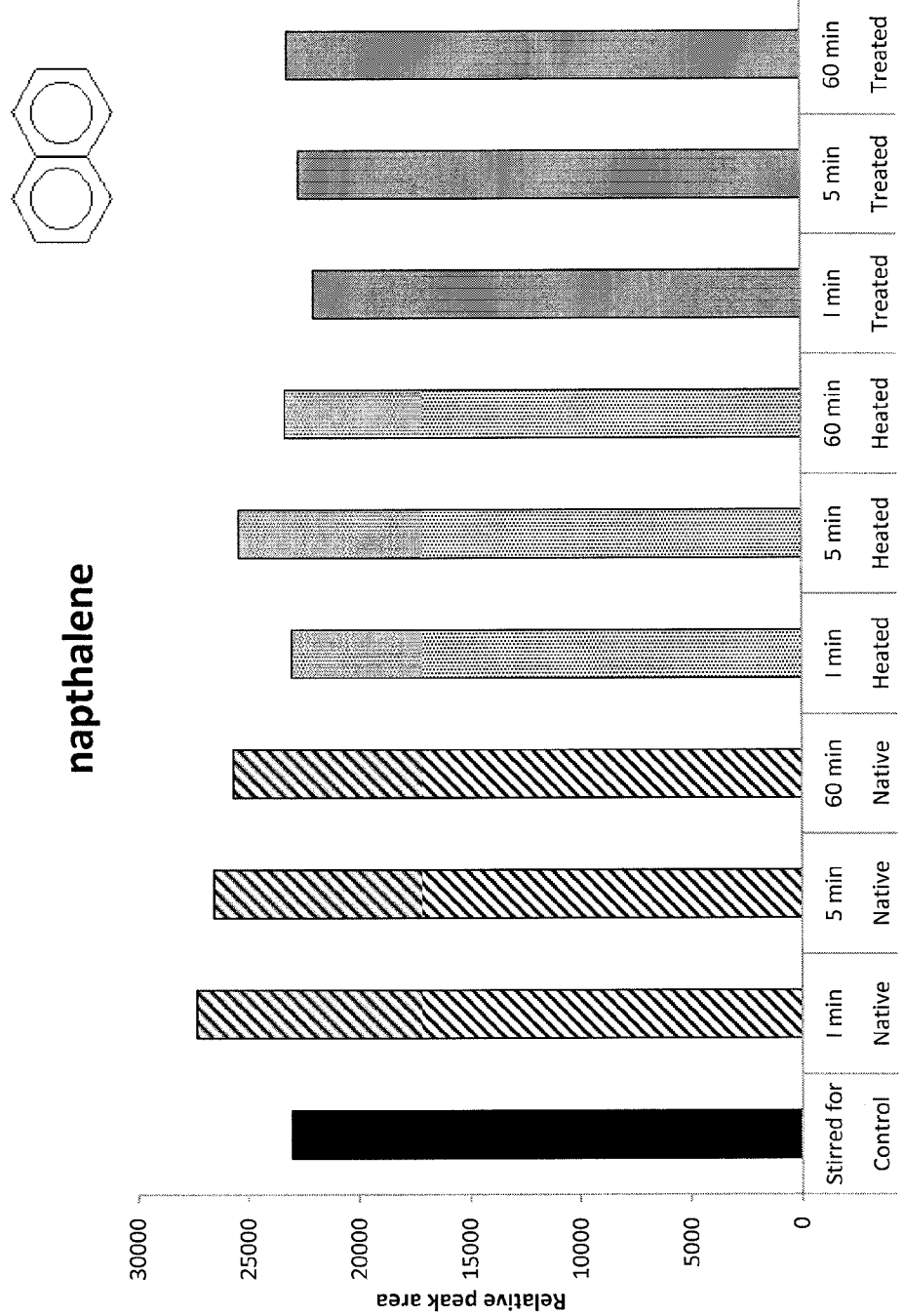
FIGS. 3 to 7 shows selected results of removal of PAHs from solution using filters of the invention.
Figure 4:
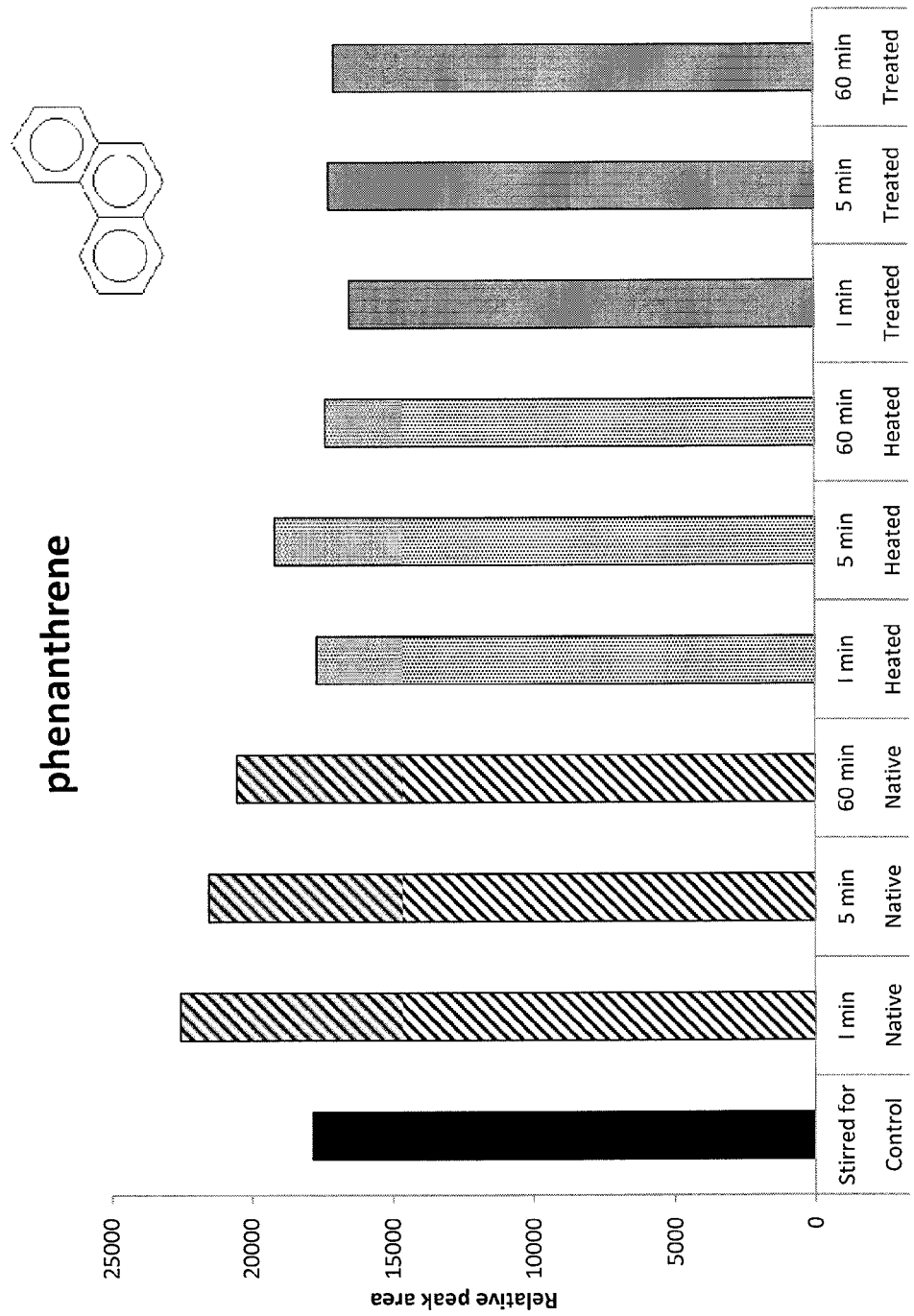
Figure 5:
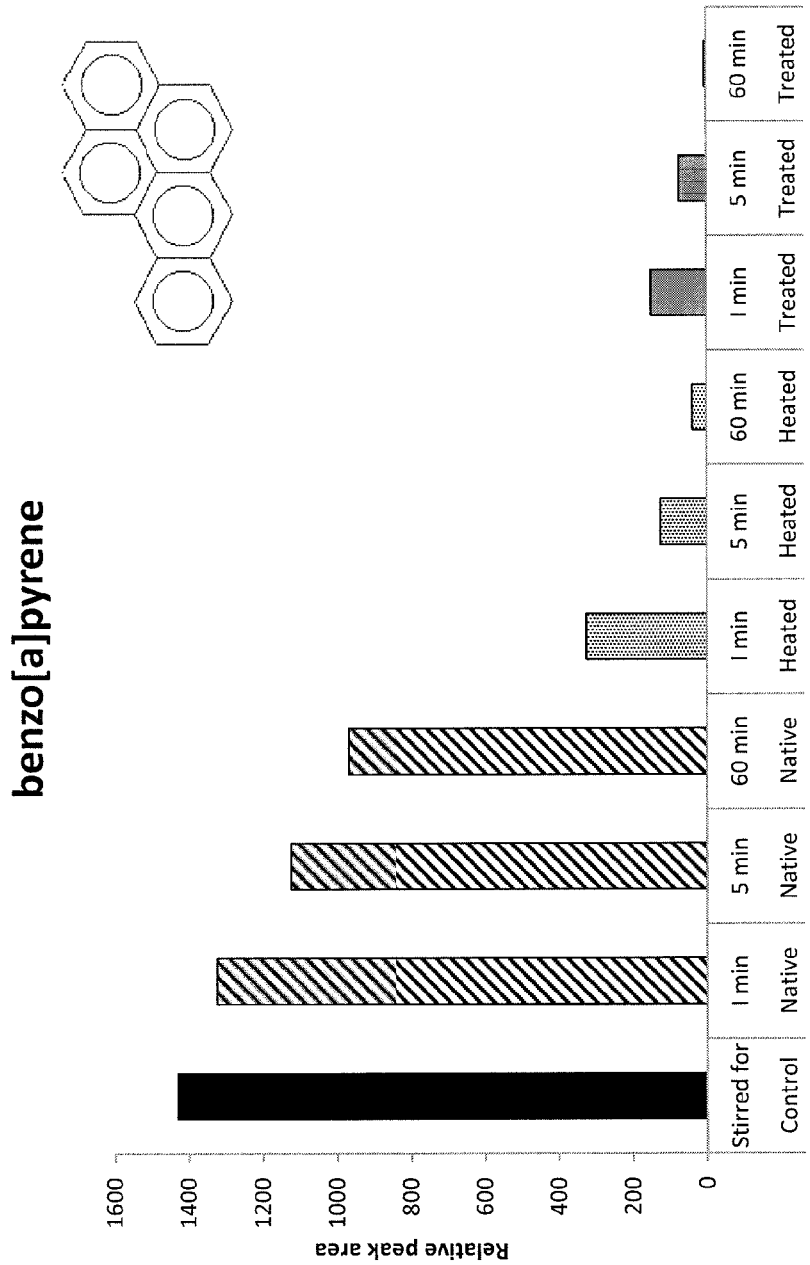
Figure 6:
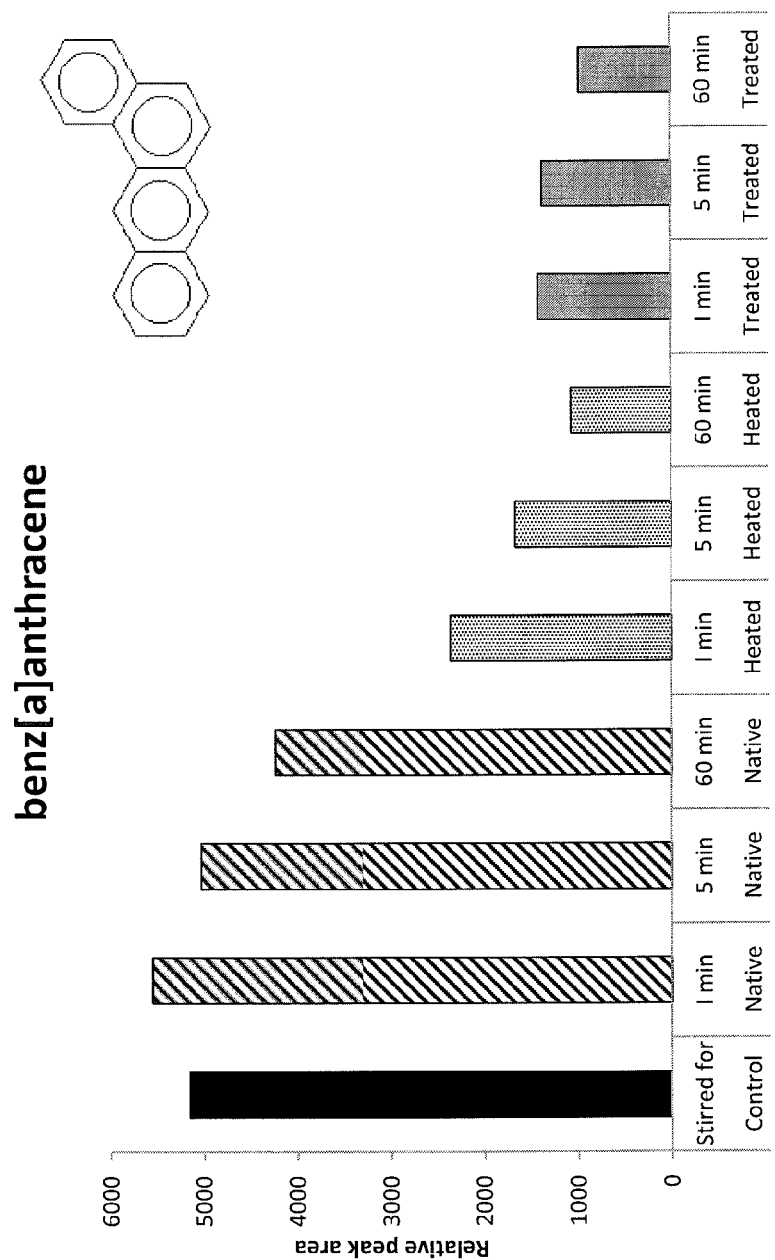
Figure 7:
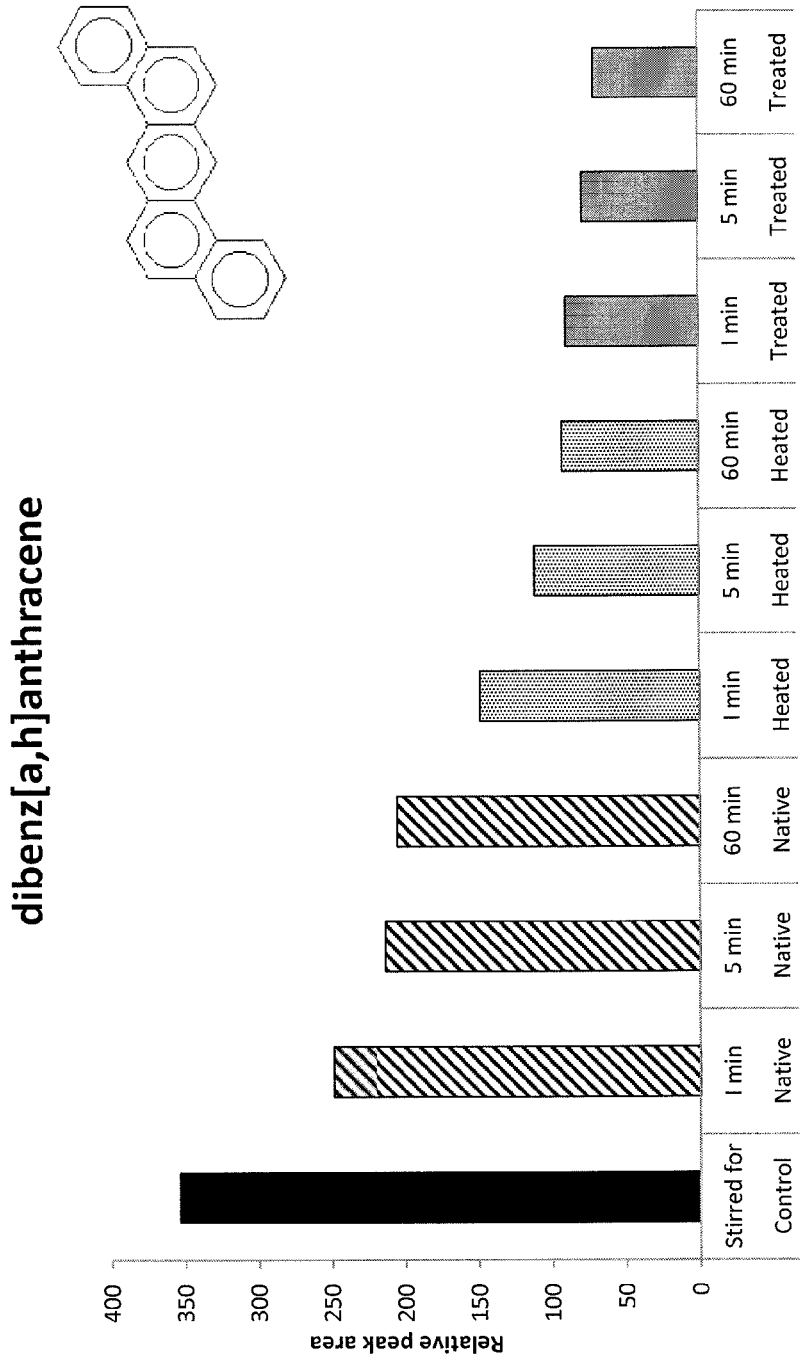

A stainless steel smoke rig 1 was set up with a filter column 2 attached directly to a smoke furnace 4, as shown schematically in FIG. 2. A silicon rubber hose 5 was attached to the filter column with the outlet 6 entrained through a pan of rapeseed oil 7, volume 2.5 litres). Heat source 8 combusted the wood chips 9, generating smoke 10 above the chips, which flowed in the direction of the arrows driven by air entering via conduit 11 attached to compressor unit 12. Smoked passed through the filter column 2 and via the hose 5 to bubble through the oil, smoking the oil in the process.

Four Experiments were Undertaken

1) Control—filter column empty
2) filter column containing native clinoptilolite (600 g)
3) filter column containing heated clinoptilolite (600 g)
4) filter column containing ammonium chloride treated clinoptilolite (600 g).

Steel wool was used at the base of the filter column to hold the clinoptilolite in place. The smoke furnace was charged with hickory wood chips (1 kg) and heat applied to combust the wood and once smoke flow was well established the smoke hose was placed into the rapeseed oil pan and smoke bubbled through the oil.

Each experiment was conducted for 6 hours. At hourly intervals a sample of rapeseed oil (50 ml) was taken from the oil pan for sensory testing and a sample of clinoptilolite (30 g, from experiments 2, 3 and 4) was taken from the filter column for PAH analysis.

At each interval the wood was checked, stirred and if required more wood was added to maintain constant smoke flow. On completion of each experiment the remaining 6 hour smoked rapeseed oil was collected for sensory testing and PAH analysis.

Extraction of Smoked Oil Samples

Ten grams of oil were placed into a round bottomed flask, and 12 g of potassium hydroxide and 100 ml of ethanol were added. The mixture was subjected to an alkaline treatment with potassium hydroxide and ethanol by heating for 1 h (78° C.) under reflux and filtered. After cooling to room temperature the solution was transferred to a 500 ml separating funnel, and 100 ml of water and 100 ml of cyclohexane were added. The funnel was shaken and the layers were allowed to separate. The ethanol/water phase was transferred into a 250 ml separating funnel and shaken with another 50 ml of cyclohexane. The ethanol/water phase was discarded and the cyclohexane phases were combined. The cyclohexane was washed successively with 50 ml (2 times), 50 ml methanol/water (4:1) and 50 ml of water (2 times). The cyclohexane extract was shaken with 50 ml N,N-dimethylformamide/water (9:1) solution. The layer of N,N-dimethylformamide/water solution was transferred into a 250 ml separating funnel, 50 ml of 1% NaCl solution were added and PAH were extracted with 75 ml of cyclohexane. The cyclohexane phase was dried over anhydrous sodium sulphate and concentrated by rotary evaporator under reduced pressure (40° C.). The extract was applied to a SPE column previously conditioned with cyclohexane (5 ml). The flask was rinsed with cyclohexane (3 ml), and the PAH were eluted with 6 ml cyclohexane. The collected fraction was evaporated to approximately 1 mL under a light stream of nitrogen. The concentrated extract were transferred to autosampler vials ready for analysis by GC/MS.

The results are shown in the table below.

PAH content of oil samples

| PAH | Control | Native | Reduction | Heated | Reduction |
|---|---|---|---|---|---|
| napthalene | 200533 | 265411 | −32%* | 110099 | 45% |
| acenaphthylene | 9455 | 11111 | −18%* | 13689 | −45%* |
| acenaphthene | 8197 | 7870 | 4% | 3206 | 61% |
| fluorene | 24035 | 21612 | 10% | 7253 | 70% |
| phenanthrene | 48410 | 43607 | 10% | 15193 | 69% |
| anthracene | 10964 | 6032 | 45% | 2654 | 76% |
| fluoranthene | 11896 | 10331 | 13% | 5135 | 57% |
| pyrene | 11052 | 8249 | 25% | 4170 | 62% |
| benz[a]anthracene | 1514 | 711 | 53% | 373 | 75% |

-continued

PAH content of oil samples

| PAH | Control | Native | Reduction | Heated | Reduction |
|---|---|---|---|---|---|
| chrysene | 4276 | 2936 | 31% | 974 | 77% |
| benzo[b]fluoranthene | 696 | 660 | 5% | 200 | 71% |
| benzo[k]fluoranthene | 256 | 450 | −76%* | 133 | 48% |
| benzo[a]pyrene | 520 | 0 | 100%* | 0 | 100% |
| indeno[1,2,3-cd]pyrene | 288 | 771 | −168%* | 94 | 67% |
| dibenz[a,h]anthracene | 245 | 606 | −147%* | 0 | 100% |
| benzo[ghi]perylene | 337 | 710 | −111%* | 173 | 49% |

NB* the results for some 2 benzene-ring containing PAHs and for larger PAHs using native (not heated and not treated) filter material are consistent with observations by others of the effect of raw clinoptilolite on crude extracts containing PAH mixtures. Results using treated filter material (not shown) were very similar to those using heated.

The experiment shows that benzo[a]pyrene was completely removed to below the level of detection by clinoptilolite (native and heated).

There is a significant pattern of reduction of PAHs across the spectrum when heated clinoptilolite is used as a smoke filter in the smoking of oil.

The results further confirm that there appears to be an additional affinity between benzo[a]pyrene and clinoptilolite compared to other PAHs. Benzo[a]pyrene is taken up by heated and heated/treated clinoptilolite more efficiently in the dichloromethane experiment below and in this experiment native clinoptilolite and heated clinoptilolite reduced the benzo[a]pyrene level to below the level of detection.

The most toxic PAHs (Groups 1 and 2A), benzo[a]pyrene (Group1), benz[a]anthracene (Group 2A) and dibenz[a,h]anthracene (Group 2A) were either removed to below the level of detection or in the case of benz[a]anthracene reduced by 75% by heated clinoptilolite.

Hence, heated filter of the invention selectively reduced the levels of the PAHs containing 4 or more benzene rings.

EXAMPLE 5—REMOVAL OF PAHS FROM PAH-CONTAINING SOLUTION

An experiment was undertaken to measure the selective removal of PAHs by filters of the invention from a solution of dichloromethane.

Method:

Ammonium Chloride Treatment: native clinoptilolite was stirred with 10× its weight of a 1M solution (53.5 g/L) for 18 h, during which time the ammonium chloride solution was refreshed twice.

Dichloromethane containing 200 micrograms per kg of 16 PAH standards (20 ppm cocktail in dichloromethane diluted with solvent 1:100) was stirred at ambient temperature in the presence of control material and heated and treated filters of the invention. After defined time periods, the solution was decanted off, the PAHs extracted and measured by GC-MS on an EZfaast column using single ion monitoring, specific to each of the PAHs.

Materials:

Standards used were napthalene, acenaphthylene, acenaphthene, fluorene, phenanthrene, anthracene, fluoranthene, pyrene, benz[a]anthracene, chrysene, benzo[b]fluoranthene, benzo[k]fluoranthene, benzo[a]pyrene, indeno[1,2,3-cd]pyrene, dibenz(a,h)anthracene, benzo[ghi]perylene. Nonadecane was used an internal standard.

Clinoptilolite (medium grade sieve mesh No 14) used was either a) native, b) heated to 270° C. in a thin layer for 1 h or c) treated with ammonium chloride and heated to 270° C. in a thin layer for 1 h and d) was a control without clinoptilolite.

Results

The results are in the table below. FIGS. 3-7 show graphically the results for naphthalene, phenanthrene and three relevant known carcinogens benzo(a)pyrene, benz(a) anthracene and dibenz(a.h)anthracene.

TABLE

Results (peak areas) of Control, Native (MU), Heated (MH) and NH☐Cl Treated (MT) Clinoptilolite in a 20 ppb PAH spiked solution of dichloromethane with samples taken at intervals of 1, 5 and 60 minutes.

|  | Control | MU1 | MU5 | MU60 | MH1 | MH5 | MH60 | MT1 | MT5 | MT60 |
|---|---|---|---|---|---|---|---|---|---|---|
| Internal standard (nonadecane) | 152212 | 183276 | 178232 | 171388 | 154444 | 171231 | 161042 | 153190 | 155611 | 159067 |
| Naphthalene | 23040 | 27368 | 26575 | 25712 | 23063 | 25461 | 23374 | 22098 | 22754 | 23282 |
| acenaphthylene | 17523 | 23110 | 22327 | 21460 | 17327 | 16368 | 7590 | 15907 | 14016 | 6929 |
| acenaphthene | 12599 | 16685 | 16243 | 15219 | 12361 | 12351 | 8387 | 11813 | 10648 | 7050 |
| fluorene | 13030 | 17296 | 16610 | 15936 | 13829 | 14935 | 13162 | 13244 | 13692 | 13549 |
| phenanthrene | 17854 | 22566 | 21542 | 20543 | 17696 | 19186 | 17389 | 16524 | 17265 | 17090 |
| anthracene | 15346 | 19970 | 19282 | 18347 | 14113 | 13376 | 8335 | 13210 | 12035 | 7730 |
| fluoranthene | 14616 | 19333 | 19053 | 18158 | 15088 | 14742 | 12673 | 13935 | 14582 | 14188 |
| pyrene | 14700 | 18935 | 18578 | 17932 | 12990 | 11185 | 6299 | 11715 | 10408 | 5602 |
| benz[a]anthracene | 5158 | 5560 | 5038 | 4243 | 2365 | 1670 | 1072 | 1425 | 1380 | 982 |
| chrysene | 7197 | 8636 | 8207 | 7430 | 4808 | 3723 | 2473 | 3126 | 3361 | 2253 |
| benzo[b]fluoranthene | 1836 | 1398 | 1166 | 1018 | 663 | 583 | 442 | 447 | 467 | 376 |
| benzo[k]fluoranthene | 3873 | 3802 | 3368 | 2845 | 1347 | 974 | 474 | 620 | 715 | 507 |
| benzo[a]pyrene | 1430 | 1326 | 1127 | 970 | 325 | 125 | 39 | 150 | 74 | 5 |
| indeno[1,2,3-cd]pyrene | 323 | 240 | 222 | 210 | 159 | 108 | 56 | 100 | 71 | 39 |
| dibenz[a,h]anthracene | 354 | 249 | 214 | 206 | 149 | 112 | 93 | 90 | 79 | 71 |
| benzo[ghi]perylene | 515 | 428 | 325 | 371 | 181 | 93 | 28 | 93 | 78 | 11 |

The data shows that the larger PAHs are being taken up by the pore structure of the heated and the heated/treated clinoptilolite when in solution resulting in their selective removal from solution.

EXAMPLE 6—REMOVAL OF PAHS FROM SMOKED OIL

Oil derived from coconut oil (deodorised, also referred to as MCT oil—medium chain triglyceride oil) was smoked for 72 hours using smoke from oak chips. The resultant oil was stirred with heated filter material for 18 hours and the PAH content of the oil tested and compared with the PAH content of similarly smoked oil not contacted with the filter. PAHs were extracted using saponification and SPE and analysed by GC-MS. Results (expressed as peak areas) are in the table below.

| PAH | Control (no filter) | Stirred with heated filter material | % PAH reduction |
|---|---|---|---|
| napthalene | 90246 | 59291 | 34 |
| acenaphthylene | 3514 | 2591 | 26 |
| acenaphthene | 5297 | 3080 | 42 |
| fluorene | 16137 | 7384 | 54 |
| phenanthrene | 35921 | 30036 | 16 |
| anthracene | 4403 | 3611 | 18 |
| fluoranthene | 5674 | 3738 | 34 |
| pyrene | 6908 | 4444 | 36 |
| benz[a]anthracene | 907 | 529 | 42 |
| chrysene | 2115 | 1516 | 28 |
| benzo[b]fluoranthene | 651 | 95 | 85 |
| benzo[k]fluoranthene | 268 | 128 | 52 |
| benzo[a]pyrene | 347 | 68 | 80 |
| dibenz[a,h]anthracene | 169 | 86 | 49 |
| benzo[ghi]perylene | 330 | 124 | 62 |

EXAMPLE 7—REMOVAL OF PAHS FROM SMOKED OIL

Rapeseed oil (deodorised) was smoked on the rig using native or heated clinoptilolite to filter out PAHs, with a control smoking using an empty filter bed. Native and heated filter were then compared to empty filter. PAHs were extracted from the oil using saponification and SPE and analysed by GC-MS. Results (expressed as peak areas) are in the table below.

| PAH | Empty | Native | % PAH Reduction | Heated | % PAH Reduction |
|---|---|---|---|---|---|
| napthalene | 218368 | 285181 | −31 | 118213 | 46 |
| acenaphthylene | 9065 | 11446 | −26 | 13483 | −49 |
| acenaphthene | 8045 | 8492 | −6 | 3523 | 56 |
| fluorene | 23266 | 21464 | 8 | 7012 | 70 |
| phenanthrene | 48328 | 43595 | 10 | 15309 | 68 |
| anthracene | 10282 | 5622 | 45 | 2443 | 76 |
| fluoranthene | 12678 | 10298 | 19 | 5122 | 60 |
| pyrene | 10936 | 8401 | 23 | 3921 | 64 |
| benz[a]anthracene | 1581 | 645 | 59 | 283 | 82 |
| chrysene | 3762 | 2587 | 31 | 722 | 81 |
| benz[b]fluoranthene | 595 | 565 | 5 | 171 | 71 |
| benzo[k]fluoranthene | 443 | 383 | 14 | 126 | 72 |
| benzo[a]pyrene | 731 | 466 | 36 | 112 | 85 |
| indeno[1,2,3-cd]pyrene | 497 | 488 | 2 | 143 | 71 |
| dibenz[a,h]anthracene | 388 | 333 | 14 | 86 | 78 |
| benzo[ghi]perylene | 550 | 537 | 2 | 205 | 63 |

Again, selective removal of the 4 or more benzene ring containing PAHs was achieved. These oils were subjected to volatile profile analysis—see results presented in FIG. 1. These indicated that there was substantially no change in the volatile profile, with corresponding peak heights and peak areas seen through all traces, hence that the smokey flavour was unchanged.

EXAMPLE 8—X-RAY DIFFRACTION ANALYSIS OF FILTER MATERIAL

All X-ray diffraction work was carried out on a Bruker AXS D8 Advance diffractometer operating in transmission capillary mode, equipped with a 2 kW copper anode X-ray tube operating at 40 kV/40 mA and a focussing Ge(111) monochromator to give an incident Cu Kα1 X-ray beam, λ=1.54056 Å. The X-ray detector was a Bruker Lynx Eye position sensitive detector.

Clinoptilolite (Native and Heated)

A sample of clinoptilolite was loaded into a 0.7 mm borosilicate glass capillary and aligned on a goniometer head before mounting on the diffractometer for final alignment. The mounted capillary was rotated during data collection in order to minimise any preferred orientation present. An Oxford Cryosystems Cryostream Compact, mounted co-axially with the sample, allowed temperature control of the sample in the range room temperature to 220° C.

The following general scheme was used for all data collections:

Data collection range: 4°-45° 2θ
Step size: 0.017° 2θ
Count time per step: 0.6 seconds The temperature of the Cryostream was ramped from 20° C. to 220° C. in 10° C. increments, then cooled to 20° C., with the sample allowed to equilibrate at each temperature for 5 minutes before a diffraction data collection was started.

Results

The initial scan at 20 degrees C. was compared with the 220 degrees C. scan. There were significant differences, particularly in respect of intensities at low angle between the two—showing a structural change as a result of water removal by heating.

When datasets at all temperatures were overlaid it was seen that whilst the total changes are significant, there are no major transitions at any given temperature. Rather, the changes appeared continuous.

After standing for hours, the sample appeared much as it did at 220° C. or at 20° C. post-heating—hence there was little change in that time. After standing for days, however, the heated sampled reverted to look much closer to its original pre-heating state.

Figure 8:
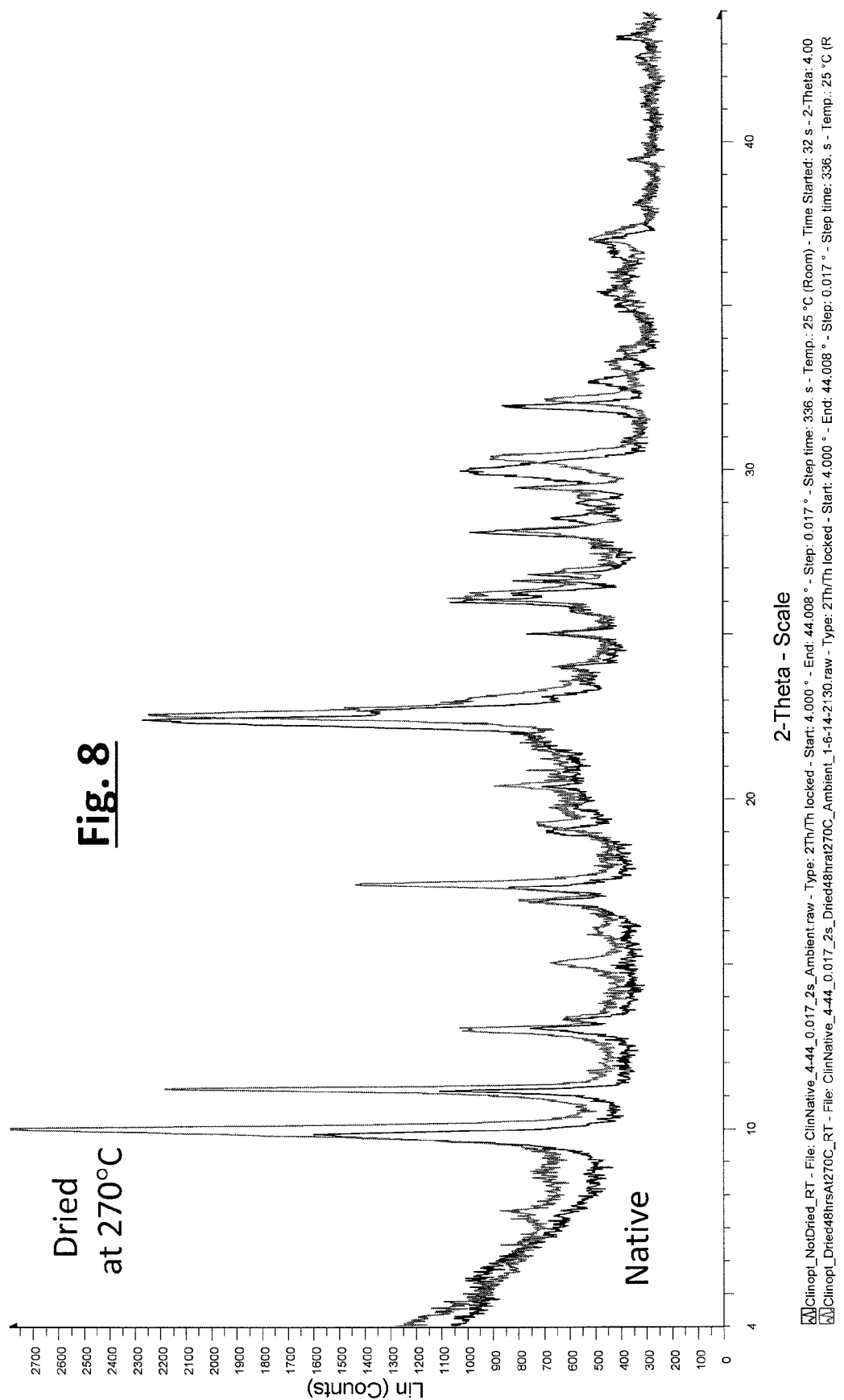
FIG. 8 shows a X-ray diffraction comparison of native filter versus filter heated at 270° C.

Separate filter material was heated to 270° C. for about 6 hours. FIG. 8 shows a comparison of native filter versus this heated filter. There are significant changes in the clinoptilolite structure heated at 270° C. compared to unheated control sample.

Thermal Work

A thermogravimetric measurement was carried out on a TA Instruments Q50 thermogravimetric analyser. 53.55 mg of clinoptilolite was accurately weighed into a sample pan and placed in the instrument. The sample was first equilibrated at 30° C. then raised to 270° C. at a rate of 5° C./min, then held at 270° C. to give a total experiment duration of 12 hours. The weight of the sample was recorded over the course of the experiment.

Results

The results showed that the sample undergoes a water loss of ca. 11.5%, with the majority of the water loss occurring by the time the sample reaches 270° C. Water loss is essentially complete after 2 hours.

Ammonium Chloride Treated Clinoptilolite

These data were collected on a Bruker D8 Advance Powder Diffractometer

Wavelength=Cu K alpha 1
Geometry=Flat plate reflection
Sample presentation=Standard Bruker flat plate sample holder containing powder
Scan range=4 to 45 degrees two theta
Step size=0.017 degrees
Count time=5 s/step
Run time per sample=ca. 3.5 hrs Additional sample preparation info: The samples as supplied were in the form of large granules that were extremely hard and in fact too hard to grind easily using a mortar pestle. As such, each sample was ball-milled in a 5 ml container containing two stainless steel balls for 2 minutes at 30 Hz. This reduced the particle size sufficiently for the samples to be able to be packed into the flat plate sample holder.

Results

Figure 9:
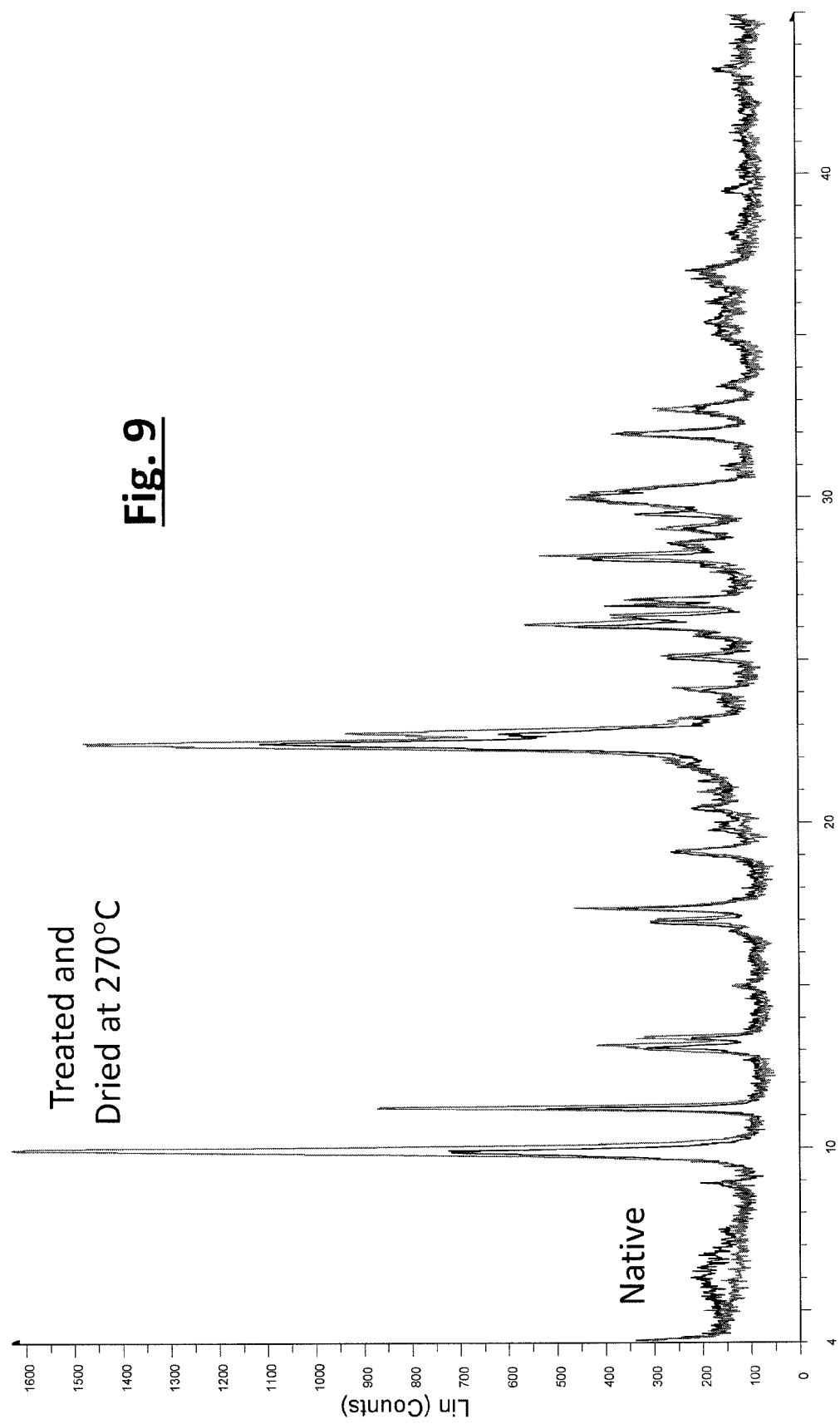
FIG. 9 shows a X-ray diffraction comparison of native filter versus filter that was ammonium chloride treated and then heated at 270° C.

Treatment of clinoptilolite with a solution of ammonium chloride followed by heating to 270° C. for 1 hour resulted in significant structural changes in the clinoptilolite matrix, as evidenced by the X-ray diffraction data—shown in FIG. 9 (versus "native").

There was a marked difference between the native clinoptilolite and the treated clinoptilolite and although the ammonium chloride treated samples showed some of the characteristics of the purely heat treated clinoptilolite samples there were additional peak shifts in other sections of the X-ray profile especially around 22 deg two theta and 30 deg two theta. Hence, the ammonium treated filter exhibited clear and detectable structural changes.

An ammonium chloride treated sample of clinoptilolite added to water then dried at 90° C. showed no tendency to take up moisture and revert back to its original state. Hence, some of those changes were not reversed by water exposure.

Conclusions from X-Ray Work

Drying (achieved in this case by heating) produced significant structural changes, which were continuous with no sudden phase changes.

A temperature of 270° C. produced a complete loss of water in 6 hours.

The loss of free and bound water accounted for the observed changes.

Removal of water improved the activity of the clinoptilolite as a PAH filter.

Dried clinoptilolite reverted to its original state in 19 hrs stored at ambient temperature in an open vessel.

Dried clinoptilolite did not take up water quickly when stored in a sealed environment or kept in an open capillary.

Treatment of clinoptilolite with ammonium chloride produced further changes in the structure compared with heating, changes that were irreversible, such that subsequent uptake of water was prevented or inhibited—enhancing the lifetime and improving the PAH filter efficiency.

Accordingly, the invention provides a method for producing smoke for smoking foods, apparatus therefor, and food produced by these methods.

The invention claimed is:

1. A method of preparing a food, comprising:
   (a) providing a food,
   (b) filtering smoke to selectively remove one or more polycyclic aromatic hydrocarbons (PAHs) that contain 4 or more benzene rings therefrom, wherein the filtering comprises filtering the smoke such that the removal of the PAHs that contain 4 or more benzene rings is in greater proportion than the removal of naphthalene and/or phenanthrene, and
   (c) contacting the treated smoke of (b) with the food of (a), thereby providing a smoke food,
   wherein the method comprises generating smoke from a source comprising an intimate mixture of (i) a filter comprising clinoptilolite, and (ii) combustion material from which smoke for smoking food for human consumption can be generated.

2. The method of claim 1, comprising selectively removing the PAHs benzo(a)pyrene, benz(a)anthracene, dibenz(a,h)anthracene, two of those PAHs or all three.

3. The method of claim 1, wherein the filtering comprises filtering the smoke selectively to remove the PAHs that contain 4 or more benzene rings relative to removal of smoke flavored components from the smoke.

4. The method of claim 1, wherein the filter comprises pores of size no greater than about 1 nm.

5. The method of claim 1, wherein the filter comprises pores of size no greater than 0.7 nm.

6. The method of claim 1, wherein the level of the one or more PAHs is reduced by in excess of 70% relative to unfiltered smoke.

7. The method of claim 1, wherein the food is a foodstuff, a food additive, a food flavoring and/or a food ingredient.

8. A method of preparing a food, comprising:
(a) filtering smoke to selectively remove one or more polycyclic aromatic hydrocarbons (PAHs) therefrom, and
(b) contacting the filtered smoke of (a) with a food, wherein the filtered smoke is generated from a composition comprising an intimate mixture of (i) -clinoptilolite and (ii) combustion material from which smoke for smoking food can be generated.

9. The method of claim 8, wherein the combustion material comprises wood.

10. The method of claim 1, wherein the combustion material comprises wood chips, wood dust and/or wood shavings.

* * * * *